US006875926B2

(12) United States Patent
Buekers et al.

(10) Patent No.: US 6,875,926 B2
(45) Date of Patent: Apr. 5, 2005

(54) LONGITUDINALLY ACTIVATED COMPRESSION SEALING DEVICE FOR ELONGATE MEMBERS AND METHODS FOR USING THE SAME

(75) Inventors: Valere Buekers, Zelem-Halen (BE); Jos Brants, Korbeek-Lo (BE); Roger Alaerts, Aarschot (BE); Fons Vranckx, Tielt-Winge (BE); Randy Wilkinson, Angier, NC (US); James A. Croce, Coats, NC (US); Chien-An Chen, Apex, NC (US); David J. Hardie, Kent (GB)

(73) Assignee: Tyco Electronics Raychem NV (BE)

( * ) Notice: Subject to any disclaimer, the term of this patent is extended or adjusted under 35 U.S.C. 154(b) by 0 days.

(21) Appl. No.: 10/719,691

(22) Filed: Nov. 21, 2003

(65) Prior Publication Data

US 2004/0144555 A1 Jul. 29, 2004

(30) Foreign Application Priority Data

Nov. 30, 2002 (GB) .............................................. 0227985
Oct. 4, 2003 (GB) .............................................. 0323267

(51) Int. Cl.[7] .............................................. H02G 3/00
(52) U.S. Cl. ................... 174/100; 174/65 G; 174/77 R; 24/16 R
(58) Field of Search .............................. 174/100, 77 R, 174/65 G, 65 R, 23 R, 99 R; 24/16 R

(56) References Cited

U.S. PATENT DOCUMENTS

| 3,141,686 A |   | 7/1964 | Smith et al. |   |
|---|---|---|---|---|
| 4,061,344 A |   | 12/1977 | Bradley et al. |   |
| 4,267,401 A | * | 5/1981 | Wilkinson ................ | 174/77 R |
| 4,424,412 A |   | 1/1984 | Goetter et al. |   |
| 4,622,436 A | * | 11/1986 | Kinnan ...................... | 174/77 R |
| 5,007,701 A |   | 4/1991 | Roberts |   |
| 5,027,478 A | * | 7/1991 | Suhr .......................... | 24/16 R |
| 5,191,633 A |   | 3/1993 | Von Bagh |   |
| 5,479,554 A |   | 12/1995 | Roberts |   |
| 5,742,982 A | * | 4/1998 | Dodd et al. ................. | 24/16 R |
| 5,949,022 A |   | 9/1999 | Park et al. |   |
| 6,201,921 B1 |   | 3/2001 | Quesnel et al. |   |
| 6,353,186 B1 | * | 3/2002 | Dams et al. ............... | 174/65 G |
| 6,426,462 B1 | * | 7/2002 | Mignon et al. ........... | 174/65 R |

FOREIGN PATENT DOCUMENTS

| DE | 3240339 A | 3/1984 |
| DE | 100 20 493 A1 | 11/2001 |
| DE | 10020493 A | 11/2001 |
| FR | 2328894 A | 5/1977 |
| FR | 2 593 578 | 1/1986 |

(Continued)

OTHER PUBLICATIONS

International Search Report for PCT/GB03/04842 .mailing date Apr. 20, 2004.

(Continued)

*Primary Examiner*—Dhiru R Patel
(74) *Attorney, Agent, or Firm*—Myers Bigel Sibley & Sajovec

(57) ABSTRACT

A compression-expandable plug provides lateral expansion of an elastomeric gasket to seal around mini-tubes within an optical fiber duct, the mini-tubes containing optical fibers. The compression-expandable plug includes an elastomeric gasket having longitudinal passages configured to be positioned around optical-fiber-containing mini-tubes in an optical fiber duct and means for longitudinally compressing the gasket thereby laterally expanding it to exert sealing pressure around the mini-tubes and between the mini-tubes and the duct. A means for limiting the longitudinal compression applied to the gasket to limit the sealing pressure to a level selected to limit damage to the optical fibers may be provided.

28 Claims, 5 Drawing Sheets

FOREIGN PATENT DOCUMENTS

| | | |
|---|---|---|
| FR | 2 593 578 A2 | 7/1987 |
| FR | 2 650 049 | 7/1989 |
| FR | 2650049 A | 1/1991 |
| FR | 2 758 017 | 12/1996 |
| FR | 2758017 A | 12/1996 |
| GB | 724596 | 5/1953 |
| GB | 2 262 392 A | 6/1993 |
| JP | 20000378018 A | 2/2000 |
| JP | 2001 033673 | 2/2001 |
| JP | 2001033673 | 2/2001 |
| SU | 760270 A | 8/1980 |
| WO | WO 97/42693 | 11/1997 |

OTHER PUBLICATIONS

International Search Report for PCT/GB03/04842.
GB Search Report for 0323267.5 dated Mar. 12, 2004.
GB Search Report for 0227985.9 dated May 8, 2003.

* cited by examiner

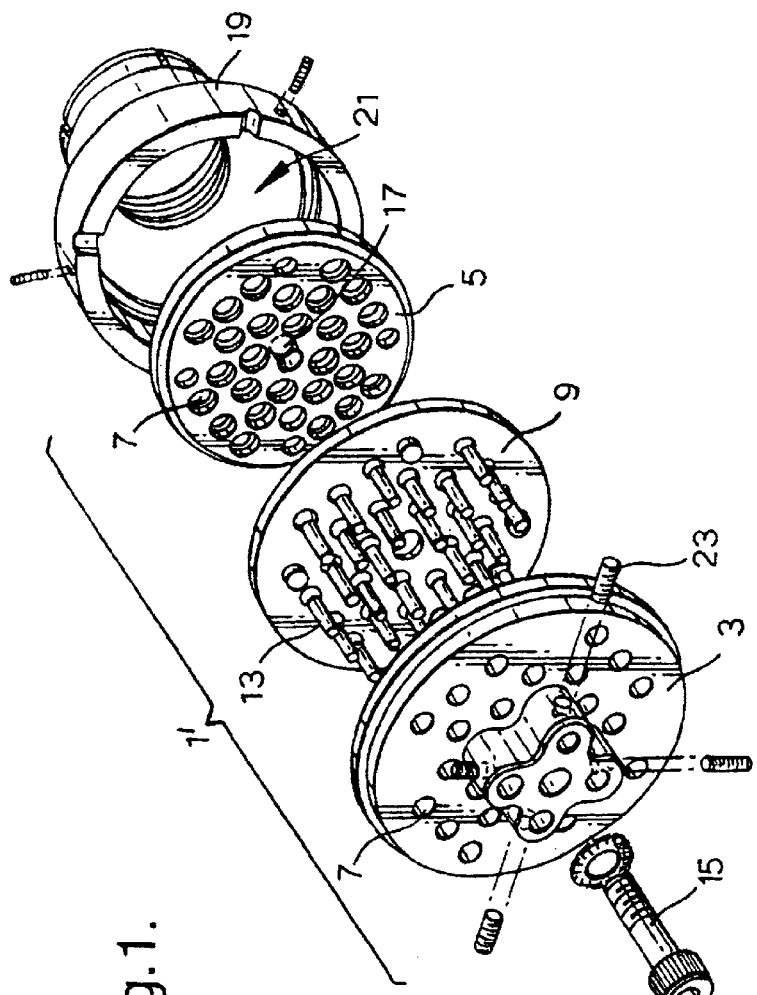
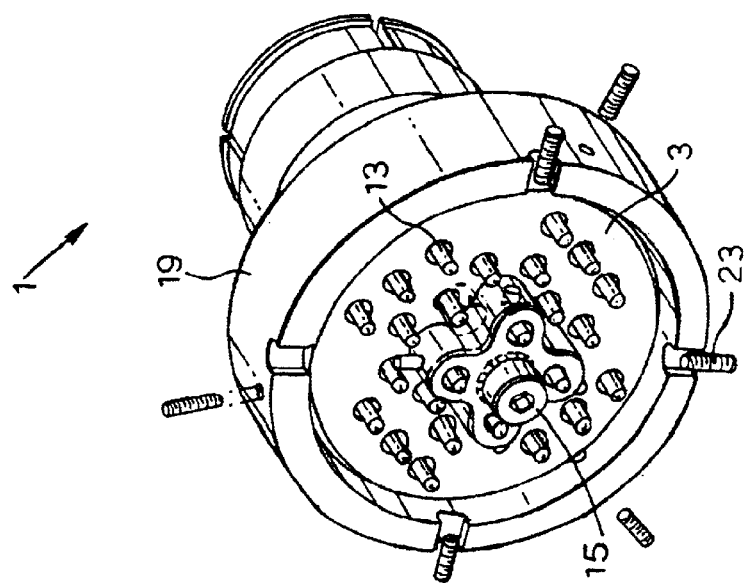
Fig.1.

LONGITUDINALLY ACTIVATED COMPRESSION SEALING DEVICE FOR ELONGATE MEMBERS AND METHODS FOR USING THE SAME

RELATED APPLICATIONS

This application claims priority from Great Britain Application No. 0227985.9, filed Nov. 30, 2002 and Great Britain Application No. 0323267.5, filed Oct. 4, 2003, the disclosures of which are hereby incorporated herein by reference.

BACKGROUND OF THE INVENTION

The present invention relates to sealing devices and, more particularly, to sealing devices for sealing an opening in an object between the object and at least one elongate article extending through the opening, for example, sealing the end of a duct through which one or more cables, pipes or smaller ducts (often formed "micro-ducts") extend.

It is known to seal an opening in an object, such as a splice case in which splices between telecommunications or power cables are enclosed. A variety of approaches are known for sealing in such environments. One type of known seal for such enclosures includes the use of a pair of compression plates and a deform able sealing material between the plates that is deformed into sealing contact with the object and with the cables. For example, U.S. Pat. No. 4,267,401 (Wilkinson), UK Patent Application GB 2 262 392 A (Jack Moon), and International Patent Application WO 97/42693 disclose seals of this type.

SUMMARY OF THE INVENTION

One aspect of this invention relates to the use of compression-expandable plugs to seal around and secure mini-tubes in optical fibre cable ducts, thus resisting (a) movement of the mini-tubes within the ducts, which might damage the fragile optical fibres contained inside the mini-tubes, and (b) passage of fluids along the ducts, which fluids might enter and contaminate working areas such as manholes, or equipment rooms or enclosures. This aspect of the invention accordingly provides (1) use of a compression-expandable plug providing lateral expansion of an elastomeric gasket to seal around mini-tubes within an optical fibre duct, the mini-tubes containing optical fibres; and (2) a compression-expandable plug for the above use, comprising an elastomeric gasket having longitudinal passages positionable in use around optical-fibre-containing mini-tubes in an optical fibre duct, and means for longitudinally compressing the gasket thereby laterally expanding it to exert sealing pressure around the mini-tubes and between the mini-tubes and the duct.

This use of such plugs runs contrary to the expectation that the plug sealing pressure would risk damaging the optical fibres, such damage not being an issue with electrical cables. Therefore, according to this aspect of the invention, means may be provided for limiting the applied plug pressure to levels below those at which damage to the optical cable components becomes a significant risk.

Another aspect of the invention provides a sealing device for sealing an opening in an object between the object and at least one elongate article extending through the opening, comprising a pair of compression plates, at least two deformable sealing elements spaced apart from each other between the plates, and a compression device arranged to compress the sealing elements by moving the plates towards each other thereby expanding the sealing elements in a lateral direction with respect to the direction of movement of the plates such that each sealing element makes a respective sealing contact with the object or elongate article, wherein the sealing elements are spaced apart from each other in the lateral direction, and a first of the sealing elements is located between the compression plates along a lateral periphery of the plates, thereby to make a sealing contact with the object.

A further aspect of the invention provides a kit of parts for forming a sealing device according to the first aspect of the invention, comprising the pair of compression plates, the at least two deformable sealing elements, and the compression device.

These aspects of the invention may have the advantage that, because the sealing device comprises sealing elements spaced apart from each other between the compression plates (in order to provide their respective sealing contacts), it may avoid the need to compress a mass of sealing material extending throughout the entire area between the plates as with the above described prior art. This may reduce the compression force required to deform the seals and make the sealing contacts (for a given sealing material). Consequently, it may be easier for the installation engineer to form the seal and for the seal to be formed without damaging the micro-ducts or other elongate articles. Also, the seal may be more reliable because it may be less prone to failure over time due to the use of a lower compression force (in addition to the enhanced reliability due to the seal being easier to form in the first place). Additionally, the use of a lower compression force may mean that the strength and robustness of the various components of the sealing device is generally less critical than hitherto (with the associated manufacturing advantages).

Each compression plate may include at least one aperture, the apertures of the plates being in alignment and together providing a channel through the sealing device to allow an elongate article to extend through the device.

The sealing device may include at least one second sealing element located between the plates around a channel, to make a sealing contact with an elongate article extending through the channel. The sealing device may include a plurality of such channels, each of which has a respective second sealing element located therearound.

Each sealing element may be a tube. The tube may have a length at least as great as its external diameter. Alternatively, each sealing element may comprise an O-ring, for example. A plurality of O-rings (for example, two) may be located next to each other to form a combined sealing element (and therefore in effect acting as a sealing tube). A possible advantage of a tube-shaped sealing element (or a plurality of O-rings combining to form a single sealing element) is that the sealing contact may be greater than that of a single O-ring, for example. A possible advantage of a tube sealing element over a plurality of O-rings may be that the tube is generally easier to handle and to install.

In particular embodiments of the invention, the sealing device comprises a support located between the compression plates, to which the sealing elements are attached. The sealing elements may be integral with the support and the support and the sealing elements may be formed as a single piece. The support may comprise a sheet, but other forms of support may be used, for example it may comprise a framework or the like. For embodiments in which the support comprises a sheet, the sheet may be, for example, perforated.

The support may be dimensioned such that it is not compressed when the sealing elements are compressed (to form their respective sealing contacts). In particular, the sealing elements and the support may have relative thicknesses in the dimension in which the compression plates are moved towards each other by the compression member, such that when the sealing elements are compressed and form their respective sealing contacts, the support is not compressed.

In some embodiments of the invention, each sealing element may be blocked by a removable blocking part that may be removed to allow an elongate article to extend through the sealing element. The blocking parts may be elongate and extend through at least one of the compression plates so that they may be removed without removing the sealing elements from between the plates. Additionally or alternatively, each aperture of at least one of the compression plates may be blocked by a removable blocking piece that may be removed to allow an elongate article to extend through the aperture.

The compression plates may be generally circular (i.e. generally disk-shaped). However other shapes are possible depending, for example, upon the shape of the opening in the object that needs sealing. Also, although they are described herein as "plates," it is to be understood that they need not be substantially in the form of plates as other shapes are possible as long as they fulfil their purpose of compressing the sealing elements.

The compression device may generally be any device (including a plurality of discrete parts) suitable for moving the compression plates towards each other to compress the sealing elements. In particular embodiments of the present invention, the compression device comprises at least one screwthreaded device (e.g. a bolt or a screw fastener) arranged to form a screwthreaded engagement with the compression plates.

The compression plates may be movable towards each other by means of the compression device such that when the plates are as close as possible to each other, the sealing elements undergo a preset lateral expansion. This may have the advantage of ensuring that the correct, preset sealing contacts may be made. Additionally or alternatively, the sealing device may include an indicator to indicate when the compression plates have been moved towards each other by a correct predetermined distance such that the preset lateral expansion of the sealing elements (and hence the preset sealing contact of each of the sealing elements) has been made. The indicator may comprise at least one indicator member arranged to extend from one of the compression plates through the other compression plate, or from the support through one of the compression plates, such that when the relative movement of the plates by the predetermined distance has been achieved, the indicator member extends through the compression plate.

The object in which the sealing device seals an opening may, for example, be a duct, a splice case, or the like. The elongate article or articles may, for example be micro-ducts, cables, pipes or the like. However, in some embodiments of the invention, the object in which the sealing device seals an opening may itself comprise part of the device or kit. For example, the object may comprise a housing that is attachable to an end of a duct (or the like), the housing and the remainder of the sealing device together sealing the end of the duct.

The sealing elements (and also the support for some embodiments of the invention including a support) may be formed from polymeric material. The polymeric material may be rubber, for example, synthetic rubber, such as nitrile rubber, silicone rubber etc. The material may be in the form of a foam (such as a closed cell foam).

BRIEF DESCRIPTION OF THE DRAWINGS

Embodiments of the invention will now be described, by way of example, with reference to the accompanying drawings, of which:

FIG. 1 is an exploded perspective view of some embodiments of a sealing device kit according to the invention and a perspective view of the assembled sealing device;

DETAILED DESCRIPTION OF THE INVENTION

Figure 2:
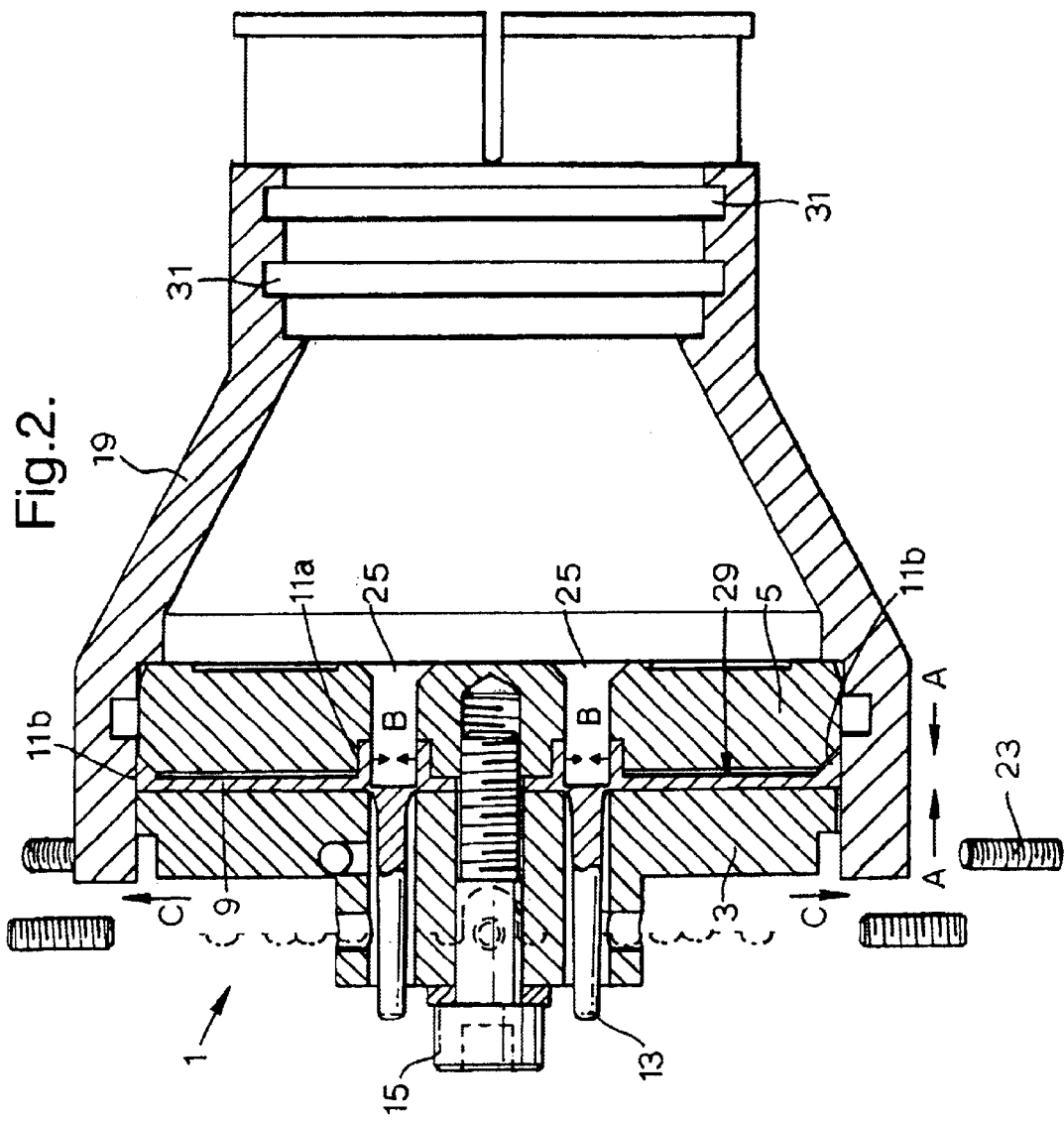
FIG. 2 is a cross-sectional view of the assembled sealing device of FIG. 1.

Referring to the drawings, FIG. 1 shows a sealing device 1 including a compression-expandable plug 1' comprising a pair of compression plates 3 and 5, each of which has a plurality of apertures 7 extending through the plate, through which elongate articles (not shown) may extend during use. Between the compression plates 3 and 5 is a support 9 in the form of a synthetic rubber flexible sheet. The support 9 has attached thereto (and in fact integrally moulded with the sheet) a plurality of second sealing elements 11a in the form of tubes that project from a major surface of the support. Because of the perspective of the drawing, the second sealing elements 11a are not visible in FIG. 1, however, they are shown in cross-section in FIG. 2.

FIG. 1 does, however, show elongate removable blocking parts 13 projecting from the opposite major surface of the support 9 to that from which the sealing element tubes 11 project. Each blocking part 13 is associated with a respective second sealing element 11a and blocks the channel formed by the aligned apertures 7 and the second sealing element 11a in the assembled sealing device. As shown in the view of the assembled sealing device shown in FIG. 1, the elongate blocking parts 13 project through the apertures 7 in the "front" compression plate 3, and they may be selectively removed as required by being torn away from the support 9 to allow an elongate article, e.g. a micro-duct, to extend through the channel in the sealing device that the blocking part had originally blocked off.

FIG. 1 also shows a compression device 15 in the form of a screwthreaded bolt that is arranged to extend through both compression plates 3 and 5 and the support 9, and to move the plates towards each other by means of a corresponding screwthread 17 in the "rear" compression plate 5. Also shown in FIG. 1 is a housing 19 of the sealing device, in which the compression plates and the support are arranged to be installed, to seal an opening 21 in the housing. The entire sealing device, including the housing 19, may be arranged to be installed on the open end of a duct (for example) in the manner illustrated in FIG. 3, in order to seal the end of the duct. The compression plates and support may be secured in the housing 19 by means of screw fasteners 23.

Figure 3:
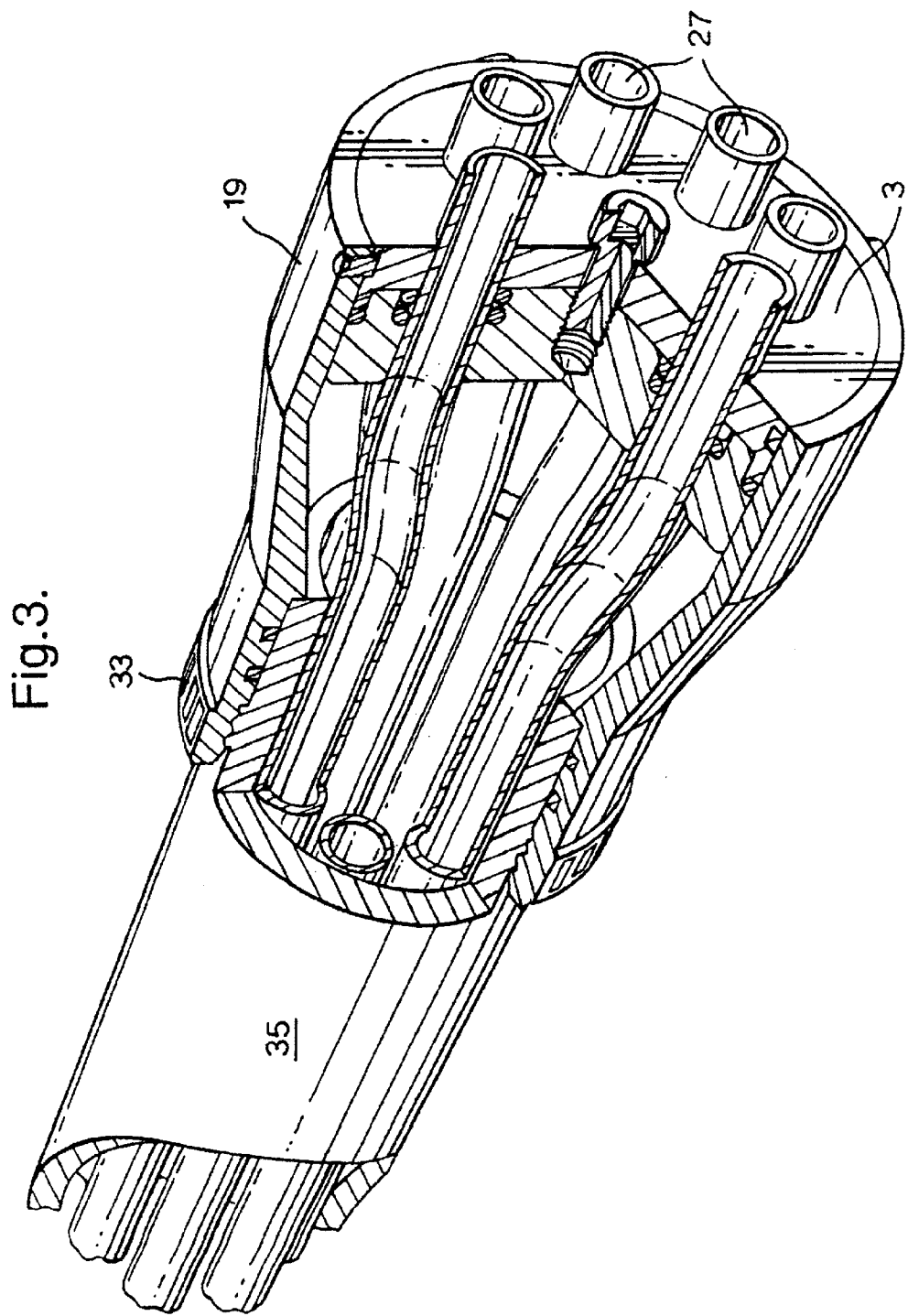
FIG. 3 is a partially cut away perspective view of further embodiments of a sealing device according to the invention installed on the open end of a duct carrying seven microducts.

FIG. 2 shows the assembled sealing device 1 of FIG. 1 in cross-section. Two of the tube shaped second sealing elements 11a are shown in this view. Each second sealing element 11a is arranged to seal a respective channel 25 extending through both compression plates 3, 5, and the support 9 when an elongate article, for example a micro-duct 27 as shown in FIG. 3, extends through the channel (the respective blocking part 13 having been removed beforehand). Movement of the compression plates 3, 5 towards each other by the screwthreaded compression device 15 as indicated by arrows A causes each second sealing element 11a to be expanded laterally as indicated by arrows B into sealing contact with a respective elongate article extending through the sealing device. This movement of the compression plates 3, 5 towards each other also compresses another sealing element, namely first sealing element 11b that is arranged along the periphery of the compression plates (between the plates). The first sealing element 11b consequently is expanded laterally outwards as indicated by arrows C into sealing contact with the housing 19. First sealing element 11b is also in the form of a tube projecting from a major surface of the support 9 (similarly to the second sealing elements 11a), however the diameter of the tube of first sealing element 11b is considerably larger than that of second sealing elements 11a.

As illustrated in FIG. 2, each of the sealing elements 11a and 11b are spaced apart from each other between the compression plates. Also as shown in FIG. 2, the relative thicknesses (in the direction of movement of the plates as indicated by arrows A) of the sealing elements and the support 9 are such that when the sealing elements are compressed between the plates, the support itself may not be compressed, i.e. there is a gap 29 between the support and at least one of the compression plates when the sealing elements are compressed. This configuration may have the advantage that because only the discrete sealing elements are compressed (and not an entire mass of sealing material extending throughout the entire area between the compression plates), lower compression forces (than would otherwise have been the case) may be required. This may provide the benefits described earlier, such as lessening the risk of damage to micro-ducts or other elongate articles extending through the sealing device. However, not only may the embodiments of the invention shown in FIGS. 1 and 2 have this particular advantage, but they may also ease assembly and handling because all of the sealing elements may be carried on a single support.

The entire sealing device 1 may be attached to the end of a duct (or the like), for example, on an outside surface of the duct, via the housing 19 in order to seal the end of the duct. There may be additional seals (for example, tubular seals or O-ring seals) between the housing 19 and the duct. Such seals may be retained in grooves 31 provided in the housing. The housing may be secured to the duct in any suitable manner, for example, by a tightened securement band 33 around the housing as shown in FIG. 3.

FIG. 3 shows an alternative embodiment of sealing device 1 according to the invention secured to the open end of a duct 35. The duct 35 carries a plurality (seven as shown) of micro-ducts 27. The micro-ducts 27 themselves may carry optical fibres, wires, cables or the like. The FIG. 3 embodiments of the sealing device as illustrated do not include a support; instead the sealing elements 11a and 11b are O-rings. It can be seen that the sealing elements 11a each comprise a pair of O-rings in FIG. 3, which may provide for increased sealing capability. The O-rings may be retained in recesses in one (or both) of the compression plates.

It can be seen in both FIG. 3 and FIG. 2 that the screwthreaded compression device 15 may be tightened only to a preset extent such that the compression plates are moved towards each other by a preset distance. This may be arranged such that the preset tightening of the compression device causes a preset lateral expansion of the sealing elements, thereby providing a desired sealing contact force between the sealing elements and their respective elongate article or object.

Figure 4:
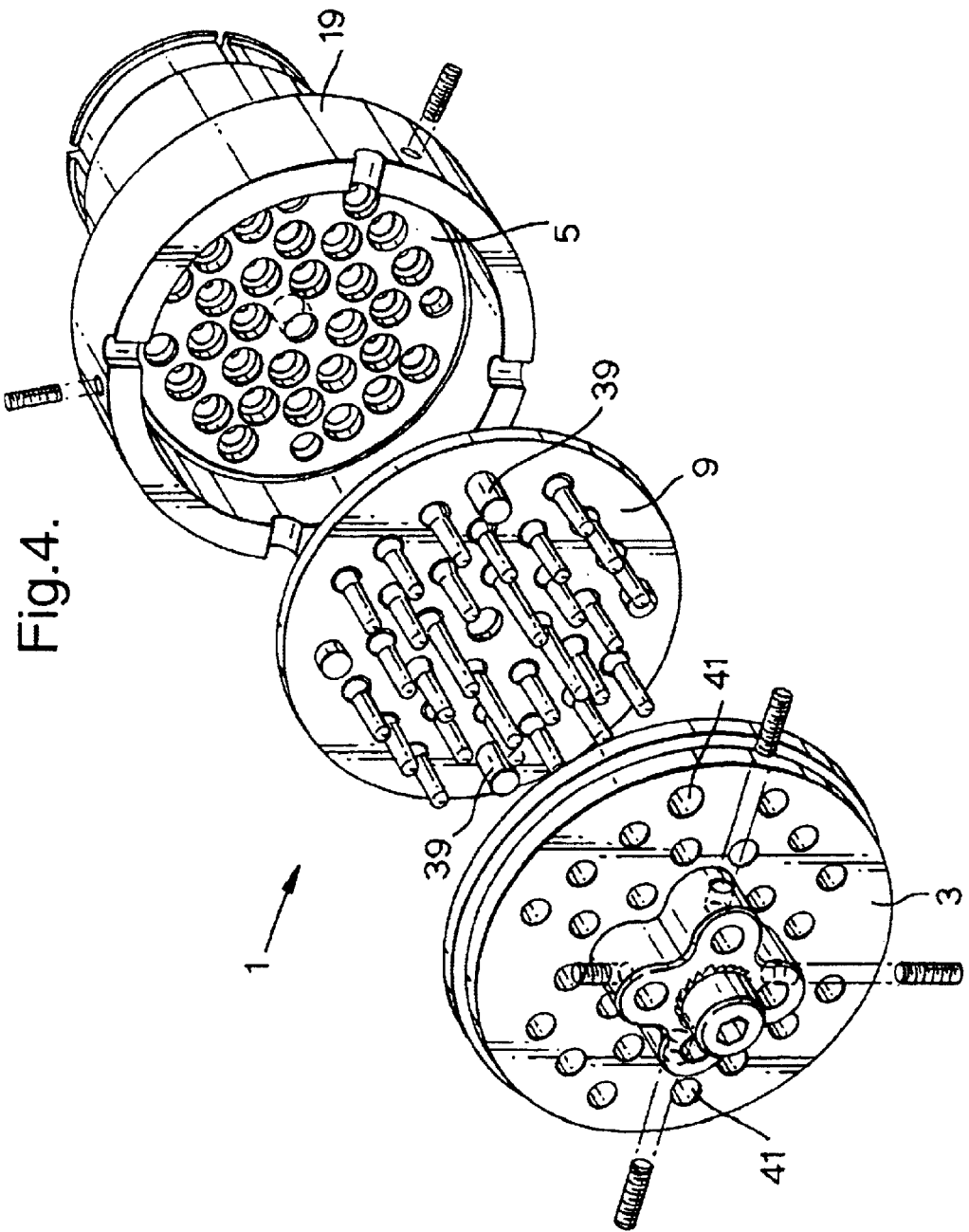
FIG. 4 is an exploded perspective view of some embodiments of a sealing device according to the present invention including indicator members to indicate when a predetermined compression of the sealing elements has been achieved.

FIG. 4 is an exploded perspective view of some embodiments of a sealing device according to the present invention, In contrast with the embodiments illustrated in FIG. 1, as illustrated in FIG. 4, the support 9 includes indicator members 39 arranged to extend through holes 41 in the front compression plate to indicate when the compression plates 3 and 5 have been moved towards each other by a predetermined distance such that a predetermined compression of the sealing elements has been achieved.

Figure 5:
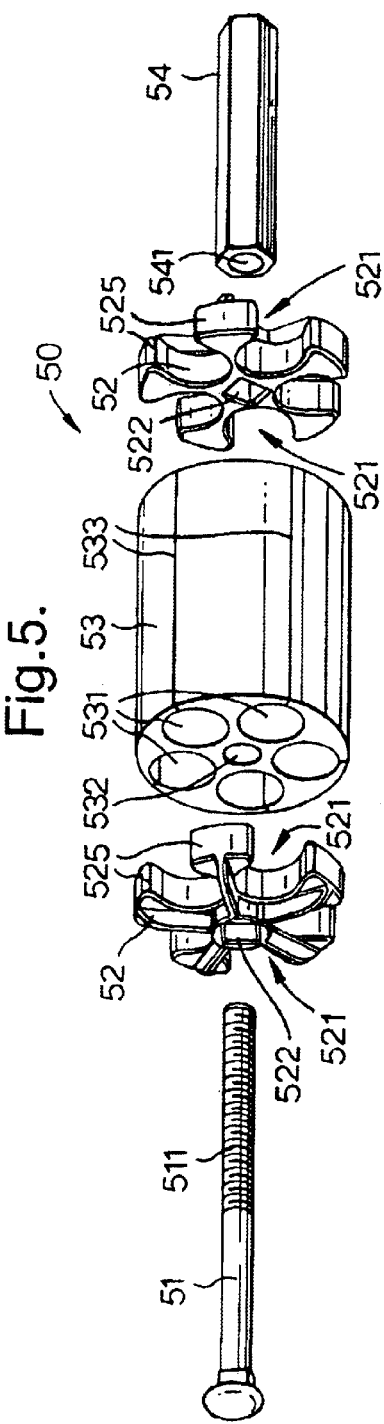
FIG. 5 is an exploded perspective view of a plug designed to seal a plurality of mini-tubes in an optical fibre duct according to some embodiments of the present invention.
Figure 6:
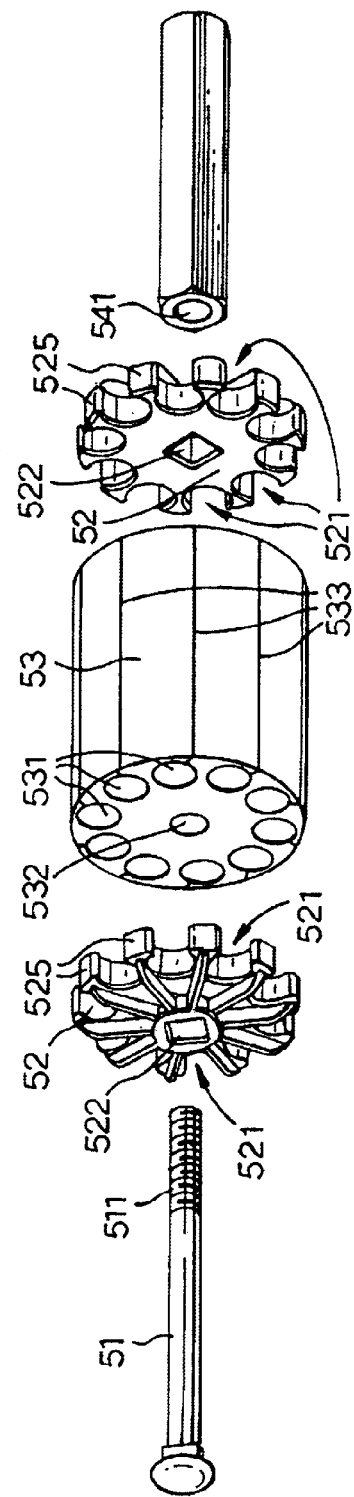
FIG. 6 is an exploded perspective view of a plug designed to seal a plurality of mini-tubes in an optical fibre duct according to yet further embodiments of the present invention.

An additional and/or complementary aspect of the compression-expandable plugs 1' is the aforementioned use of compression-expandable plugs to seal around and secure mini-tubes in optical fibre cable ducts. Embodiments of the present invention including such a feature will now be described in more detail by way of example with reference to the accompanying perspective drawings, in which corresponding parts are correspondingly numbered. FIG. 5 illustrates a plug 50 designed to seal up to five mini-tubes of 10 mm diameter in an optical fibre duct. FIG. 6 illustrates a plug designed to seal up to ten mini-tubes of 7 mm diameter in an optical fibre duct. The ducts are omitted in both figures for clarity. The size of the mini-tubes is not critical, and the number may be as high as, for example, twenty-four (24) in some embodiments.

Referring to FIGS. 5 and 6, a central tubular gasket 53 of flexible elastomer or other suitable material, such as chloroprene rubber, has a desired number of axial passages 531 for receiving the mini-tubes to be sealed and a central axial bore 532 for receiving a compression bolt 51. Blank filler rods may be inserted to close any of the gasket passages that are not occupied by one of the mini-tubes of the optical fibre cable. The gasket passages 531 may each have an axially- or lengthwise-extending slit 533 communicating laterally with the exterior of the gasket to allow lateral insertion of a mini-tube into each passage.

The axial length of the gasket is not critical, but may be selected by simple trial and error to seal effectively in the conditions encountered in practice. Gasket lengths within the range of about 50 millimeters (mm) to about 80 mm or within the range of about 60 mm to about 70 mm have been found advantageous in practice in some embodiments of the present invention. The laterally-extending slits 533 may be sloped or curved to enable them to be positioned extending in an anti-clockwise sense as viewed looking toward the open end of the duct into which the plug is inserted. This anti-clockwise orientation may resist undesirable opening of the slits by clockwise turning forces that may be transmitted to the gasket during clockwise tightening of the gasket compression means, for example as hereinafter described (or the opposite arrangement for counter-clockwise tightening configurations).

A compression member 52 of relatively rigid moulded plastics or other material, such as polyoxymethylene, may be provided at each end of the gasket 53, each compression member having recesses 521 corresponding with the passages 531 of the gasket and projections 525 extending between the recesses 521 to an extent approaching the outer circumference of the gasket 53. The compression members also have a central aperture 522, whereby the plug can be assembled with a compression bolt 51 of metal or engineering plastics passing through the central bore 532 of the gasket and the central apertures 522 of the compression members positioned at each end of the gasket. The mini-tubes may, in use, extend through the respective passages 531 and recesses 521 of the gasket and compression members.

The plug assembly may be completed by screwing the long nut 54 onto the thread 511 of the compression bolt 51. The nut 54 may be constructed with a blind threaded bore 541 of limited depth in order to limit the applied compression and resulting radial expansion of the gasket as the nut and bolt draw the two compression members 52 towards each other. In this way, the compression applied to the mini-tubes by the radially expanding gasket may be limited to selected safe levels.

The plug may be inserted into the optical fibre duct, from the open end of which the mini-tubes project, by sliding along the mini-tubes after they have been positioned in the passages 531 and recesses 521 of the assembled plug. Liquid soap solution, or other suitable lubricant, may be used to assist this operation. An end of the gasket may be marked (B) to ensure that it is positioned toward the head of the bolt 51 that is inserted first into the duct, which may align the preferred sloping or curved slits 533 in the anti-clockwise sense for the aforementioned reasons in a clockwise tightening configuration. The bolt head and the bolt receiving apertures 522 in the compression members may be formed to limit or even prevent rotation of the bolt relative to the compression members during tightening of the nut 54. Thus the compression members 52 in combination with the compression bolt 51 and nut 54, provide a means for longitudinally compressing the gasket thereby laterally expanding it to exert sealing pressure around the mini-tubes and between the mini-tubes and the duct and a means for limiting movement of means for longitudinally compressing the gasket to a preset distance to limit the longitudinal compression applied to the gasket so as to limit damage to the optical fibres.

The nut 54 may have an external length sufficient to facilitate engaging it by hand (initially) or with a suitable spanner or other tool inserted between the mini-tubes extending from the plug. The nut can thereby be tightened to compress and seal the gasket inside the cable duct and can subsequently be unscrewed and pulled to loosen and withdraw the plug from the duct. The mini-tubes tend to be fairly stiff and could hinder access to shorter nuts or necessitate special tools for these purposes.

In some embodiments of the present invention, the gasket, and the plug as a whole, may incorporate some or all of the other features hereinbefore described, or the arrangements shown in the accompanying illustrative drawings may be used, or other forms of compression plug may be devised in accordance with embodiments of the present invention for use in optical fibre ducts.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. In the claims, means-plus-function clauses are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

What is claimed is:

1. A compression-expandable plug comprising:
   an elastomeric gasket having longitudinal passages that are separate from one another and are configured to be positioned around optical-fibre-containing mini-tubes in an optical fibre duct;
   means for longitudinally compressing the gasket thereby laterally expanding it to exert sealing pressure around the mini-tubes and between the mini-tubes and the duct; and
   means for limiting movement of means for longitudinally compressing the gasket to a preset distance to limit the longitudinal compression applied to the gasket so as to limit damage to the optical fibres.

2. The plug of claim 1, wherein the means for longitudinally compressing comprises a nut and a bolt and wherein the means for limiting movement comprises a blind-ended thread in the nut.

3. The plug of claim 1, wherein the passages of the gasket include longitudinal slits extending laterally to an exterior surface of the gasket configured to allow lateral insertion of the mini-tubes into the passages.

4. The plug of claim 3, wherein the means for longitudinally compressing has an associated tightening orientation and wherein the slits are at least one of sloped and curved in an orientation opposite to the tightening orientation.

5. The plug of claim 4, wherein the gasket is marked to indicate an end of the gasket to insert first into the duct to orient the slits in the orientation opposite to the tightening orientation.

6. The plug of claim 5 wherein the orientation opposite to the tightening orientation is anti-clockwise as viewed from outside the end of the duct into which the gasket is inserted.

7. A sealing device for sealing an opening in an object between the object and at least one elongate article extending through the opening, the sealing device comprising:
   a pair of compression plates;
   at least two deformable sealing elements spaced apart from each other between the plates; and
   a compression device arranged to compress the sealing elements by moving the plates towards each other to expand the sealing elements in a lateral direction with respect to a direction of movement of the plates such that each sealing element makes a respective sealing contact with at least one of the object or elongate article;
   wherein the sealing elements are spaced apart from each other in the lateral direction, and a first of the sealing elements is located between the compression plates along a lateral periphery of the plates; and wherein the first of the sealing elements is located between the compression plates along a lateral periphery of the plates and wherein the sealing elements are spaced apart from each other in the lateral direction and wherein the compression device is arranged to compress the sealing elements without compressing any sealing material extending between the sealing elements.

8. A kit of parts for forming the sealing device of claim 7, including the pair of compression plates, the at least two deformable sealing elements and the compression device.

9. The sealing device of claim 7, wherein each compression plate includes at least one aperture, the apertures of the plates being in alignment and together providing a channel through the sealing device to allow an elongate article to extend through the device.

10. The sealing device of claim 9, further comprising at least one second sealing element located between the plates around the channel and configured to make a sealing contact with an elongate article extending through the channel.

11. The sealing device of claim 10, further comprising a plurality of said channels, each of which has a respective second sealing element located therearound.

12. The sealing device of claim 7, wherein at least one of the sealing elements comprises a tube.

13. The sealing device of claim 12, wherein the tube has a length at least as great as its external diameter.

14. The sealing device of claim 7, wherein at least one of the sealing elements comprises at least one O-ring.

15. The sealing device of claim 14, wherein at least one of the sealing elements comprises a plurality of O-rings.

16. The sealing device of claim 7, wherein each sealing element is blocked by a removable blocking part that may be removed to allow an elongate article to extend through the sealing element.

17. The sealing device of claim 16, wherein each blocking part is elongate and extends through at least one of the compression plates so that it may be removed from its respective sealing element without removing one of the sealing elements from between the plates.

18. The sealing device of claim 7, wherein at least one of the compression plates includes a plurality of apertures and wherein each aperture of the at least one of the compression plates may be blocked by a removable blocking piece that may be removed to allow an elongate article to extend through the aperture.

19. The sealing device of claim 7, wherein the compression plates are movable towards each other by means of the compression device such that when the plates are in a closest to each other position the sealing elements are laterally expanded by a preset amount.

20. An object including the sealing device of claim 7, wherein the object comprises a housing that is attachable to an end of a duct to seal the duct.

21. The sealing device of claim 7, wherein the sealing elements comprise a polymeric material.

22. A sealing device for sealing an opening in an object between the object and at least one elongate article extending through the opening, the sealing device comprising:

a pair of compression plates;

at least two deformable sealing elements spaced apart from each other between the plates;

a compression device arranged to compress the sealing elements by moving the plates towards each other to expand the sealing elements in a lateral direction with respect to a direction of movement of the plates such that each sealing element makes a respective sealing contact with the object and/or elongate article; and a support located between the compression plates and wherein the sealing elements are attached to the support; and wherein the sealing elements are spaced apart from each other in the lateral direction, and a first of the sealing elements is located between the compression plates along a lateral periphery of the plates.

23. The sealing device of claim 22, wherein the support and the sealing elements are formed as a single piece.

24. The sealing device of claim 22, wherein the support comprises a sheet or a framework.

25. The sealing device of claim 22, wherein the support is not compressed when the sealing elements are compressed by the compression plates.

26. The sealing device of claim 25, wherein the sealing elements and the support have relative thicknesses in the direction of movement of the compression plates such that the support is not compressed when the sealing elements are compressed by the plates.

27. A sealing device for sealing an opening in an object between the object and at least one elongate article extending through the opening, the sealing device comprising:

a pair of compression plates;

at least two deformable sealing elements spaced apart from each other between the plates; and a compression device arranged to compress the sealing elements by moving the plates towards each other to expand the sealing elements in a lateral direction with respect to a direction of movement of the plates such that each sealing element makes a respective sealing contact with the object and/or elongate article;

wherein the sealing elements are spaced apart from each other in the lateral direction, and a first of the sealing elements is located between the compression plates along a lateral periphery of the plates; and wherein the sealing device includes an indicator that indicates when the compression plates have been moved towards each other by a predetermined distance to provide a preset lateral expansion of the sealing elements.

28. The sealing device of claim 27, further comprising a support located between the compression plates and wherein the sealing elements are attached to the support and wherein the indicator comprises at least one indicator member arranged to at least one of extend from one of the compression plates through the other compression plate or from the support through one of the compression plates, such that when the relative movement of the plates by the predetermined distance has been achieved, the indicator member extends through the compression plate.

* * * * *